United States Patent [19]

Vorih et al.

[11] Patent Number: 4,726,861

[45] Date of Patent: Feb. 23, 1988

[54] METHOD AND DEVICE FOR AUTOMATICALLY CENTERING AND FEEDING BEADS ONTO A TIRE BUILDING DRUM

[75] Inventors: William J. Vorih; Viscardo Baldoni; Roberto Lippa, all of Rome, Italy; Georg Zimmer, Hamburg, Fed. Rep. of Germany

[73] Assignee: The Firestone Tire & Rubber Company, Akron, Ohio

[21] Appl. No.: 35,406

[22] Filed: Apr. 7, 1987

[30] Foreign Application Priority Data

Apr. 8, 1986 [IT] Italy .............................. 67279 A/86

[51] Int. Cl.4 ........................................... B29H 17/12
[52] U.S. Cl. .................................... 156/131; 156/136; 156/403; 156/406.2
[58] Field of Search ............... 156/126, 128.1, 130, 156/130.7, 131, 135, 136, 398–403, 405.1, 406.2, 408, 422; 414/225

[56] References Cited

U.S. PATENT DOCUMENTS

| | | | |
|---|---|---|---|
| 3,915,788 | 10/1975 | Hirata et al. | 156/131 X |
| 3,944,456 | 3/1976 | Cantarutti | 156/398 |
| 3,947,308 | 3/1976 | Brinkley et al. | 156/406.2 X |
| 4,007,068 | 2/1977 | Votani et al. | 156/126 X |
| 4,007,080 | 2/1977 | Klöpper | 156/126 X |
| 4,097,321 | 6/1978 | Kelly et al. | 156/136 |
| 4,120,714 | 10/1978 | Colombani et al. | 156/131 |
| 4,354,892 | 10/1982 | Tarantola et al. | 156/398 |
| 4,627,884 | 12/1986 | Araki | 156/126 X |
| 4,683,020 | 7/1987 | Portalupi et al. | 156/131 X |
| 4,685,992 | 8/1987 | Irie | 156/403 X |

Primary Examiner—Tom Wyse
Attorney, Agent, or Firm—Ernst H. Ruf

[57] ABSTRACT

A method and device whereby an automatic device for feeding and setting beads onto a tire building drum provides for the loose hanging of two beads and, after centering them in relation to a first axis through expansion of a hanging and automatic centering device, provides for transferring them parallel with the aforementioned first axis and coupled with respective annular transfer and setting bodies, which bodies are spaced a given adjustable distance apart and are transversely mobile between a first position, coaxial with the first axis, and a second position coaxial with a second axis coincident with the drum axis; the feeding and setting device being designed to move along the second axis for positioning the beads on the drum.

20 Claims, 4 Drawing Figures

METHOD AND DEVICE FOR AUTOMATICALLY CENTERING AND FEEDING BEADS ONTO A TIRE BUILDING DRUM

TECHNICAL FIELD

The present invention relates to a method for automatically centering and feeding beads onto a tire building drum.

BACKGROUND OF THE ART

Tire manufacturing industries are known to employ tire building drums comprising two axial portions designed to move axially in relation to each other and each is provided with externally inflatable bladders.

On the said tire building drums, each tire is formed starting from an inner carcass usually comprising an inner elastomeric layer and an outer layer consisting of one or more superimposed body plies.

On the outside of the said body plies, and in given positions along the tire building drum axis, two metal annular beads of any desired configuration and including their respective bead fillers, are placed and clamped into position by the expansion of clamping devices on the drum itself, in such a manner as to secure the said two layers and each bead onto the respective axial portion of the drum. The said two axial portions are then brought closer together so as to deform radially outward the portion of the said two layers extending between the said two beads, and the said bladders are inflated so as to turn over the said beads the parts of the said two layers projecting axially outward of the said beads, in such a manner as to form the said carcass portion.

Whereas, in recent times, feeding and assembly of the aforementioned layers onto the tire building drum have been practically fully automated, serious difficulty has been encountered in automating the handling and assembly of the beads relative to the drum, mainly due to the fact that, when set onto the drum, the beads must be perfectly aligned with the drum axis of rotation.

One known method employed in prior art machines for overcoming this difficulty consists in the use of transfer devices onto which the beads must be fitted manually an in an extremely accurate position. Once fitted with the beads, such transfer and setting devices provide for feeding the beads automatically to the tire building drum and for setting them a given distance apart on the same.

Such a solution presents a number of drawbacks, due to the fact that smooth running of the plant depends on an initial manual operation, i.e. on how accurately the operator fits the beads onto the transfer device. Furthermore, as regards timing of the various assembly stages involved, the said manual operation introduces an independent time variable poorly suited to an automated assembly process.

To overcome the aforementioned drawbacks, machines have been devised on which the beads, positioned not necessarily accurately by the operator, are picked up by a transfer device which transfers them to a setting device designed to center the beads in relation to the tire building drum and to set the beads onto the drum.

Unfortunately, this solution, too, involves a number of drawbacks, mainly due to the said setting device normally comprising two untis located at opposite ends of and connected to the tire building drum.

The presence of the said two units seriously complicates the structure of the drum, unloading of the finished tires and tire size change, thus resulting in a considerable increase in plant cost, and downtime which almost totally eliminates the advantages afforded by automation.

DISCLOSURE OF THE INVENTION

It is an object of the present invention to provide a method for automatically centering and feeding beads onto a tire building drum and involving none of the aforementioned drawbacks.

According to the present invention, there is provided a method for automatically centering and feeding beads onto a tire building drum mounted for rotation about an axis, characterized by the fact that it comprises the steps consisting of loosely hanging two beads on respective expansible hangers on automatic centering means of a unit for transferring and setting the said beads onto the said tire building drum; expanding the said hangers in such a manner as to take up the said slack and automatically position the said beads coaxial with each other and with a first axis preferably parallel with the axis of rotation of the said tire building drum; moving the said beads along the said first axis, while at the same time maintaining them coaxial with the said axis, and in transferring the said beads coupled with respective split annular supports on the said transfer and setting unit, the said annular supports being set a given adjustable distance apart, for supporting the said beads in a mutal spaced relationship identical to that which they must assume on the said drum, and being provided with preferably magnetic retaining means for the said beads; moving the said annular supports on the said transfer and setting unit, while at the same time maintaining them coaxial with each other and the said distance apart, into a position coaxial with a second axis coincident with the said axis of rotation of the said drum; moving the said transfer and setting unit parallel with the said second axis for setting the said beads onto the said drum; moving said annular supports apart so as to release the said beads onto the said drum; and moving the said transfer and setting unit away from the said drum along the said second axis.

From the foregoing description, it follows that the above invention provides for possible manual, imprecise feeding of the beads to a transfer and setting unit which is totally separate from the tire building drum and which provides for centering the beads in relation to an axis, for transferring them, appropriately spaced and centered, onto a second axis, for setting them in the assembly position on the tire building drum, and for releasing them in position and moving away from the drum.

In addition to in no way complicating the structure of the drum, such a method also provides for easy bead centering and for enabling bead centering time to be determined accurately.

According to the present invention, there is also provided a device for automatically centering and feeding beads onto a tire building drum mounted for rotation about an axis, characterized by the fact that it includes a supporting member designed to move parallel with the said axis of rotation, and a unit for transferring and setting the said beads onto the said drum; the said unit being connected integrally with the said supporting member and comprising means for automatically centering the said two beads in relation to a first axis, and means for transferring the said two centered beads into a position coaxial with a second axis coincident with the said axis of rotation; the said centering means comprising expansible hanging means designed to engage loosely each said bead and to expand in such a manner as to position the said beads coaxial with the said first axis; and the said transfer means comprising two split annular supports set a given adjustable distance apart, for supporting the said beads in a mutual spaced relationship identical to that which they must assume on the said drum, said supports also being provided with retaining means for the said beads.

The present invention will be described by way of example with reference to the accompanying drawings.

BEST MODE FOR CARRYING OUT THE INVENTION

Figure 1:
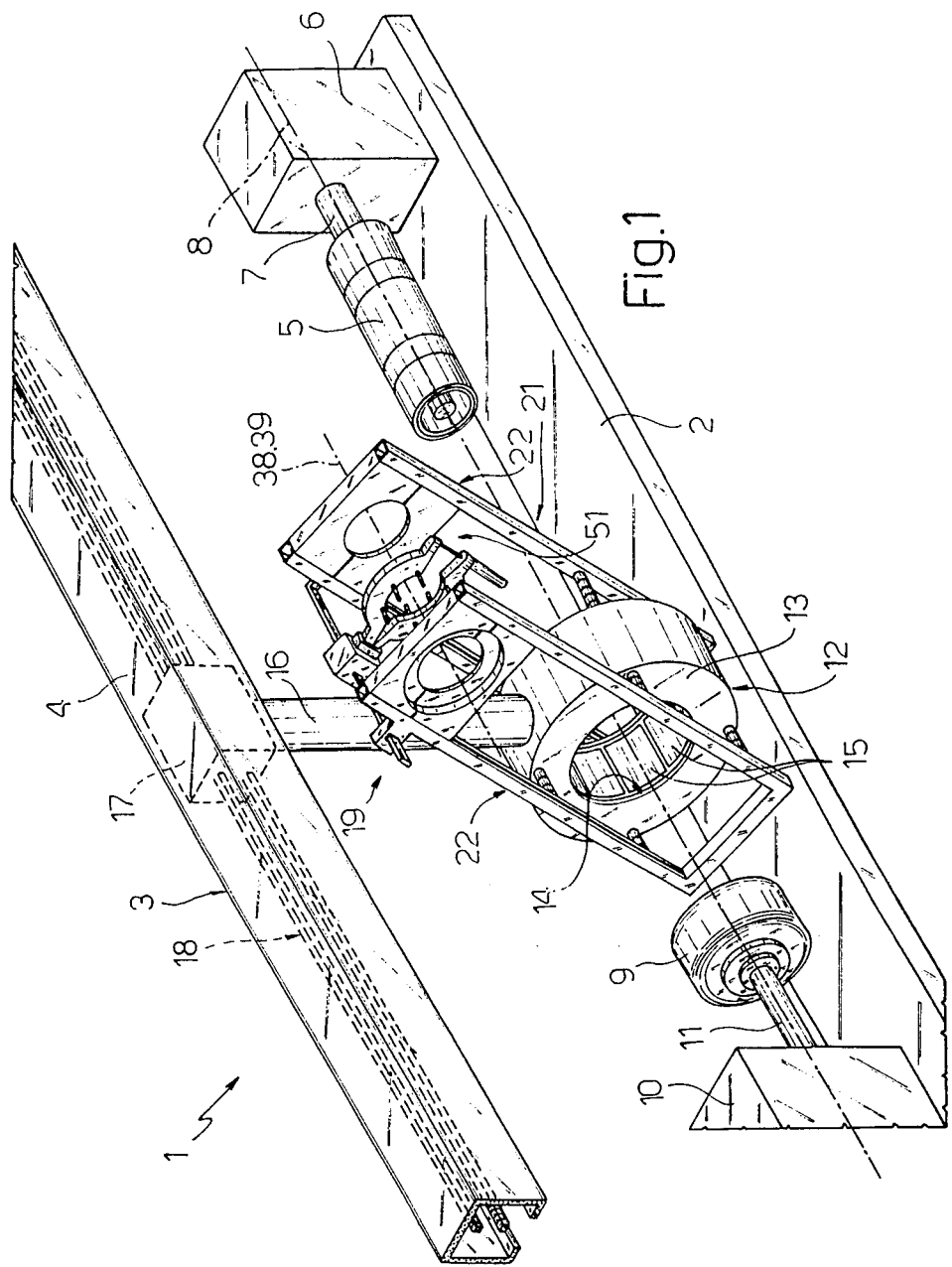
FIG. 1 is a schematic perspective view, with parts removed for clarity, of a tire assembly machine comprising an automatic bead centering and feeding device according to the teachings of the present invention.

Numeral 1 in FIG. 1 indicates a tire assembly machine comprising a base 2; a superstructure or portal 3 extending upwards from base 2 and comprising a substantially horizontal upper crosspiece 4; a unistage tyre building drum 5 mounted for rotation on a fixed support 6 at one end of portal 3 and rotated by a shaft 7 presenting an axis 8 parallel with the axis of crosspiece 4; a collapsible drum 9 facing drum 5 and mounted for rotation on a support 10 at the other end of portal 3 and rotated by a shaft 11 coaxial with axis 8; and a grab ring 12 located between drums 5 and 9.

Grab ring 12 comprises a torus 13 having a central cylindrical passage 14 coaxial with axis 8 and provided with a number of radial actuator units 15 expansible inwardly for grabbing an annular package (not shown), said annular package usually consisting of one or more annular inner belts and an outer tread, previously assembled on drum 9, for transferring and holding the said annular package on drum 5 during the formation, by drum 5, of a tire carcass (not shown), and for removing and unloading the finished green tire (not shown) off drum 5.

Grab ring 12 includes a vertical tie bar 16 extending upwards from torus 13 and connected at the top to a slide 17 mounted in such a manner as to slide along crosspiece 4 and actuated along the same by a driving means, such as a chain 18.

On machine 1, grab ring 12 also forms part of a device 19 for automatically centering and feeding pairs of beads 20 (FIG. 3) onto the tire carcass (not shown) formed on drum 5.

Figure 2:
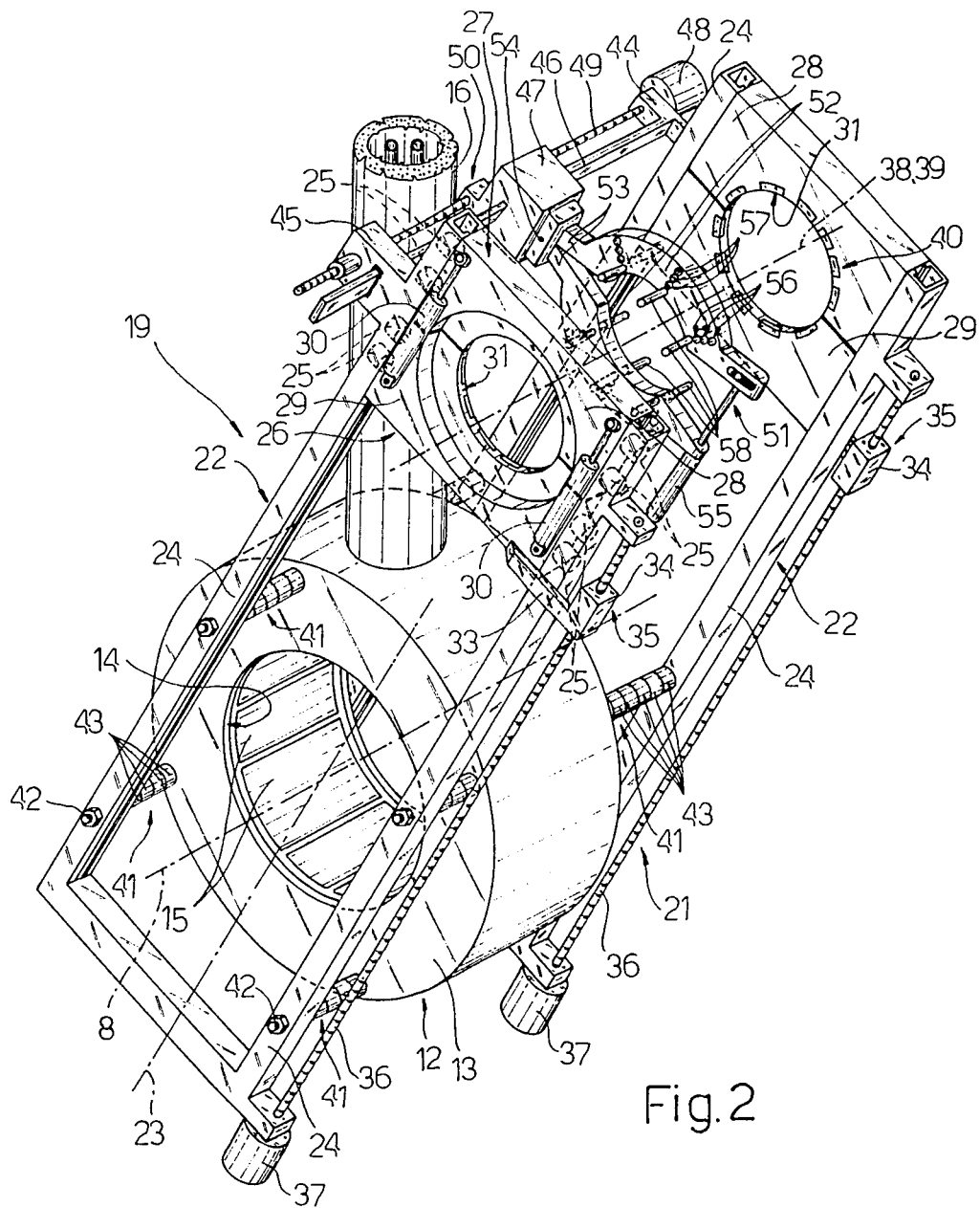
FIG. 2 is an enlarged perspective view of the FIG. 1 device.

As shown, particularly in FIG. 2, in addition to the mobile supporting member consisting of grab ring 12, device 19 comprises a unit 21 for transferring and setting beads 20, said unit 21 being mounted on ring 12 and comprising two frames 22 located facing each other on opposite sides of torus 13 and each in the form of an elongated rectangle. Frames 22 lie in planes perpendicular to axis 8 and each presents a longitudinal axis 23 intersecting axis 8 and inclined forwardly in relation to a plane formed, in FIG. 1, by axis 8 and the longitudinal axis of crosspiece 4.

Each frame 22 presents two hollow longitudinal channel members 24 parallel with their respective axes 23, having an upper portion projecting over torus 13, and separated by a distance greater than the diameter of torus passage 14. Adjacent channel members 24, which also project below torus 13 and are joined by a lower connecting member, form opposed slideways for pluralities of rollers 25 on a slide 26 comprising a horizontally split flat body 27 having a circular central cavity that is divided, perpendicularly to members 24, into two bodies 28 and 29 having complimentary semicircular central cavities. Bodies 28 and 29 are designed to move, in relation to each other and along members 24 by virtue of actuator members 30, between a contacting position, as shown in FIG. 2, and a non-contacting position (not shown), in which bodies 28 and 29 are spaced apart on slide 26.

Bodies 28 and 29 define, in the said contacting position, a circular through hole 31 having an inside diameter greater than the outside diameter of drum 5, and are arranged, in the said non-contacting position, on opposite sides of passage 14 so as to define therebetween an opening larger than passage 14 and wide enough to enable the unobstructed passage not only of a bead 20 including a respective bead filler 32 (FIG. 3), but also of a finished green tire arranged coaxial with axis 8.

Each of slides 26 is connected, by means of a respective bracket 33 integral with respective body 29, to the nut screw 34 of a screw-nut screw coupling 35, the screw 36 of which extends along one of members 24 and is turned by a motor 37. Respective motors 37 are connected by means of control devices (not shown) for moving slides 26 along respective frames 22, while at the same time maintaining the axes of holes 31 constantly aligned with axis 38 which, subsequent to displacement of slides 26, moves between a lower position, wherein axis 38 is coaxial with axis 8, and an upper position (FIG. 2) wherein axis 38 coincides with axis 39 parallel with axis 8, and slides 26 are located entirely over torus 13 and in front of tie bar 16.

On each facing surface of each slide 26, provision is made about the periphery of each respective hole 31 for a ring of magnets 40, the distance of which from the facing ring of magnets 40 on the other slide 26 may be adjusted by adjusting the length of two pins 41 connecting each member 24 to torus 13, with each pin 41 including a center bolt 42 engaging torus 13 and respective member 24, and supporting a pack consisting of an adjustable number of spacer washers 43.

Rear members 24 on frames 22 are provided at the top with respective rear transverse extensions 44 and 45, the said extension 44 being connected integral with one end of a crossbar 46 parallel with axis 8, and the other end of crossbar 46 engaging, in sliding manner, a through hole formed through extension 45. On crossbar 46, there is mounted, in sliding manner, a slide 47 designed to slide between frames 22 by virtue of an actuator device comprising a motor 48 integral with extension 44 and presenting a rotary output member consisting of a screw 49 extending in rotary manner through extension 44, engaging in rotary and axially-sliding manner a hole formed through extension 45, and connected to slide 47 by means of a screw-nut screw coupling 50. Slide 47 forms part of a device 51 for hanging and automatically centering a pair of beads 20.

Figure 4:
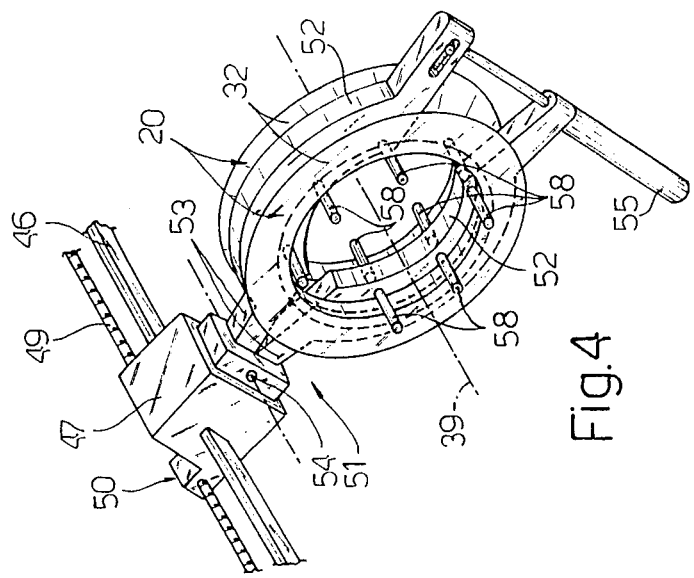
FIGS. 3 and 4 are two enlarged perspective views of a detail in FIG. 2 in two different operating positions.
Figure 3:
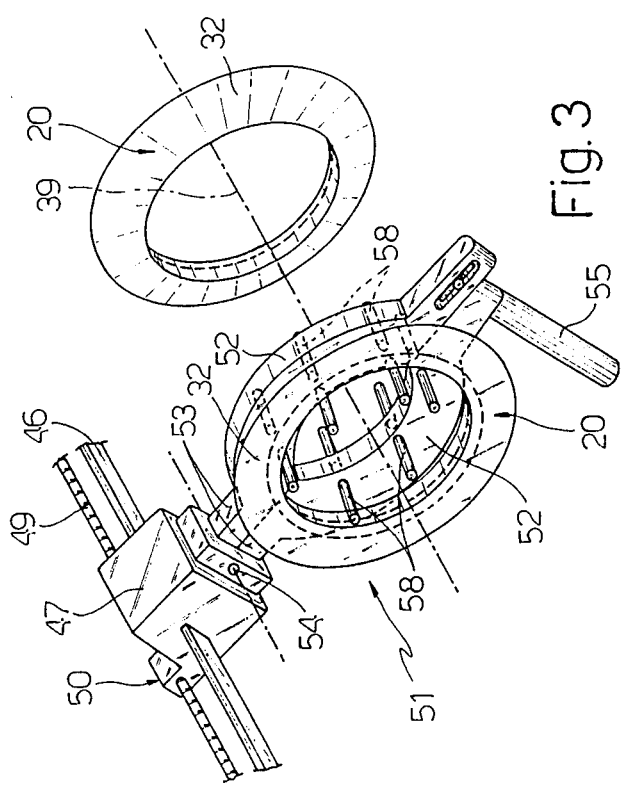

As shown, particularly in FIGS. 2, 3 and 4, device 51 comprises two curved opposite-facing jaws 52 lying in a plane perpendicular to axis 8 and presenting, at one end, respective substantially radial arms 53 the free ends of which are connected to a fulcrum pin 54 on slide 47. Between the ends of jaws 52 opposite the ends with arms 53, there is inserted a linear actuator 55 which, when activated, causes jaws 52 to rotate between a closed position (FIG. 3) and an open position (FIG. 4).

As best seen in FIG. 2, each of jaws 52 includes a number of substantially concentric rings 56 of through holes 57. On each jaw 52, the opposite ends of holes 57 in one of rings 56, selected according to the inside diameter of beads 20 being handled, are engaged by respective rollers 58 parallel with axis 8 and acting as hangers for beads 20.

In more detail and as shown in FIGS. 3 and 4, the set of rollers 58 on the same side of jaws 52 defines a respective expansible hanger which, when jaws 52 are in the closed position (FIG. 3), is of small size and engages, in radially slack manner, respective bead 20, and which, when jaws 52 are in the open position (FIG. 4), causes respective bead 20 to be raised and clamped in position coaxial with axis 39.

Prior to start-up, machine 1 is set according to the size of the tire being produced. Such setting of machine 1 substantially comprises two operations, of which the first consists in placing rollers 58 inside holes 57 on whichever of rings 56 defines, with jaws 52 in the open position, a circular hanger coaxial with axis 39 and having the same inside diameter as beads 20. The second of the said operations consists in adjusting the length of pins 41, by adding or removing washers 43, in such a manner that the distance between beads 20, when located contacting respective magnets 40, is the same as that required between beads 20 when set on drum 5.

Operation of machine 1 will now be described starting from the position shown in FIG. 1, wherein a finished green tire (not shown) has just been unloaded from grab ring 12 moving away from drum 5 toward drum 9.

During movement of grab ring 12 from drum 5 to drum 9, drum 9 is activated, and said annular package (not shown) is formed thereon in a manner well known in the art.

Before grab ring 12 moves away from drum 5 to unload the noted finished green tire therefrom, an operator hangs two beads 20 manually onto respective rollers 58 on opposite sides of jaws 52.

The aforementioned manual operation is performed extremely rapidly and easily in that, as already stated, each set of rollers 58 defines, when jaws 52 are closed, a small-sized hanger which engages the center hole of respective bead 20 with considerable radial slack.

According to a sequence controlled by a main control unit (not shown), when grab ring starts moving away from drum 5, actuator 55 is activated so as to open jaws 52 and so center each of beads 20 in relation to axis 39; and motor 48 is activated for setting and releasing beads 20 by contacting first one and than the other of the respective rings of magnets 40 on each of bodies 27, which are both arranged in their upper positions coaxial with axis 39, so that each of beads 20 is coaxial with axis 39. Motor 48 is finally operated for bringing slide 47 back to its central position; after which, actuator 55 is operated for resetting jaws 52 in the closed position.

When grab ring 12 reaches drum 9, the same is collapsed radially, so as to release the said annular package (not shown). Via operation of actuator units 15, grab ring 12 engages the noted annular package and then transfers the same towards drum 5. During this transfer operation, motors 37 are operated so as to bring slides 26 from the upper position, wherein axis 38 of holes 31 coincides with axis 39, into the lower position wherein axis 38 coincides with axis 8.

At the end of the noted transfer operation, grab ring 12, the noted annular package (not shown) and bodies 27 with the respective beads thereon envelop drum 5, onto which said inner part, comprising said at least two superimposed layers (not shown) having an inner elastomeric layer and one or more body plies, was previously fed. Expansible bead clamping devices (not shown and well known in the art) on drum 5 are then activated so as to clamp beads 20 in position on drum 5; and motors 37 and actuator members 30 are activated simultaneously so as to shift bodies 28 and 29 in opposite directions in relation to axis 8 and so release beads 20 onto drum 5 and, at the same time, define, between each pair of bodies 28 and 29, an opening centered in relation to axis 8 and of such width as to allow the unrestricted passage of a finished green tire.

In a not shown variation, the above further actuation of motors 37 is avoided by providing, between each pair of bodies 28 and 29 and the respective channel members 24, an intermediate slide (not shown), which is connected to a noted respective bracket 33, and on which the respective bodies 28 and 29 may slide in opposite axial directions under the thrust of respective actuator members (not shown) interposed between each said body 28 and 29 and said intermediate slide (not shown).

The formation of said tire carcass (not shown) and the connection of the same to the said annular package now take place in a manner well known in the art, and are completed inside grab ring 12 during the time it remains stationary on drum 5.

Actuator units 15 are then moved radially outwardly so as to enable grab ring 12 to move away from drum 5, thus releasing the substantially finished green tire on drum 5, and so as to enable the performance on drum 5 of a known stitching operation for perfecting the connection between the said annular package and the said carcass. During such displacement, bodies 28 and 29 are kept open until device 19 clears drum 5, after which, they are brought back together again by actuator members 30 and raised by motors 37 into the raised position coaxial with axis 39. Upon completion of the said stitching operation, grab ring 12 is brought back by driving means 18 onto drum 5, after which, actuator units 15 are activated for grabbing the finished green tire, and two new beads 20 are manually hung onto respective rollers 58.

At the same time, the said tire is released from drum 5 by de-activating the said expansible bead clamping devices (not shown) on drum 5. Consequently, subsequent displacement of grab ring 12 toward drum 5 enables grab ring 12 to remove the said finished green tire off drum 5. Thereafter, actuator units 15 are withdrawn and the tire is unloaded from grab ring 12 so as to enable commencement of a new cycle.

From the forgoing description and the operational discussion, when read in light of the several drawings, it is believed that those familiar with the art will readily recognize and appreciate the novel concept and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to variuous modifications, changes or the like without departing from the spirit and scope of the invention with the latter being determined solely by reference to the claims appended hereto.

What is claimed is:

1. A method for automatically centering and feeding beads onto a tire building drum mounted for rotation about an axis, the method comprising the steps consisting of loosely hanging two beads on respective expansible hangers on automatic centering means of a unit for transferring and setting the said beads onto the said tire building drum; expanding the said hangers in such a manner as to take up the said slack and automatically position the said beads coaxial with each other and with a first axis; moving the said beads along the said first axis, while at the same time maintaining them coaxial with the said axis, and in transferring the said beads coupled with respective split annular supports on the said transfer and setting unit, the said annular supports being set a given adjustable distance apart, for supporting the said beads in a mutual spaced relationship identical to that which they must assume on the said drum; moving the said annular supports on the said transfer and setting unit, while at the same time maintaining them coaxial with each other and the said distance apart, into a position coaxial with a second axis coincident with the said axis of rotation of the said drum; moving the said transfer and setting unit parallel with the said second axis for setting the said beads onto the said drum; moving said annular supports apart so as to release the said beads onto the said drum; and moving said transfer and setting unit away from the said drum along the said second axis.

2. A method as claimed in claim 1, wherein said first axis and the said second axis are parallel.

3. A method as claimed in claim 2, wherein said retaining means are magnetic.

4. A method as claimed in claim 1, wherein the displacement, parallel with the said second axis, of the said transfer and setting unit, is achieved by displacing, parallel with the said second axis, a grab ring coaxial with the said drum and constituting a support for the said transfer and setting unit.

5. A device for automatically centering and feeding beads onto a tire building drum mounted for rotation about an axis, including a supporting member designed to move parallel with the said axis of rotation, and a unit for transferring and setting the said beads onto the said drum; the said unit for transferring and setting being connected integral with the said supporting member and comprising means for automatically centering the said two beads in relation to a first axis, and means for transferring the said two centered beads into a position coaxial with a second axis coincident with the said axis of rotation; the said centering means comprising expansible hanging means designed to engage loosely each said bead and to expand in such a manner as to position the said beads coaxial with the said first axis; and the said transfer means comprising two split annular supports set a given adjustable distance apart, for supporting the said beads in a mutual spaced relationship identical to that which they must assume on the said drum, said supports also being provided with retaining means for the said beads.

6. A device as claimed in claim 5, wherein said first axis and the said second axis are parallel.

7. A device as claimed in claim 6, wherein said retaining means are magnetic.

8. A device as claimed in claim 5, wherein said centering means also comprise guide means extending parallel with the said first axis and integral with the said supporting member, and slide means bearing the said expansible hanging means and designed to slide along the said guide means from and to the said transfer means.

9. A device as claimed in claim 8, wherein said expansible hanging means comprise two curved jaws and a number of rollers extending parallel with the said first axis from each side of each said jaw; the said jaws being mutually mobile, in a plane perpendicular to the said first axis, between a first closed position and a second parted position; and the said rollers on the same side of the said two jaws defining, when the said jaws are in the said second position, a circular hanger having an outside diameter substantially equal to the inside diameter of a respective bead and being coaxial with the said first axis.

10. A device as claimed in claim 9, wherein adjusting means are provided for varying the position of each said roller on a respective one of said jaws, as a function of the inside diameter of the bead being handled.

11. A device as claimed in claim 5, wherein each said split annular support presents an inside diameter greater than the outside diameter of the said tire building drum; the said transfer means comprising, for each said bead, further guide means connected to the said supporting member and extending transversely in relation to the said first and second axis, and further slide means bearing a respective one of said split annular supports and designed to move along the said further guide means, for moving the said split annular support between two positions coaxial with the said first and the said second axis, respectively.

12. A device as claimed in claim 11, wherein said split annular support is divided into two semiannular bodies in a diametrical plane perpendicular to the said further guide means; parting means being provided between the said two semiannular bodies for displacing them mutually out of and into a closed position wherein they define the said split annular support.

13. A device as claimed in claim 5, wherein said supporting member comprises a grab ring coaxial with the said second axis and is designed to move along the same for loading an annular package, comprising an annular belt and a tread, onto a tire carcass being formed on the said drum.

14. A device for centering and feeding beads onto a tire building drum mounted for rotation about a first axis, characterized by the fact that it comprises a grab ring coaxial with the said first axis and designed to move along the same for loading an annular package comprising an annular belt and a tread onto a tire carcass expanding on the said drum; two first guide means integral with the said grab ring and facing opposed axial surfaces of the same, each said first guide means extending transversely in relation to the said first axis and comprising a longitudinal end portion extending outwards of the said grab ring; second guide means extending between the said end portions of the said two first guide means and parallel with a second axis parallel with the said first axis; automatic means for centering two said beads in relation to the said second axis, the said automatic centering means being designed to move between the said two first guide means and along the said second guide means, for supporting two annular tire beads, each facing a respective one of said first guide means, and the said automatic centering means comprising, for each said bead, hanging means expansible between a first configuration, wherein they loosely engage the respective one of said beads, and a second configuration wherein they position the respective one of said beads coaxial with the said second axis; and an annular transfer body designed to move, along each said first guide means, between two positions respectively coaxial with the said first and the said second axis; each said annular transfer body presenting an inside diameter greater than the outside diameter of the said tire building drum; retaining means being carried by each said annular transfer body and being designed to cooperate with that one of the said two beads which is arranged facing the respective one of said first guide means; each said annular transfer body being divided into two semi-annular bodies in a diametrical plane perpendicular to the respective one of said first guide means; and parting means being provided between the said two semiannular bodies, for displacing them mutually, along the respective one of said first guide means, out of and into a closed position wherein they define the said annular transfer body.

15. A device as claimed in claim 14, wherein said retaining means comprise a ring of magnets arranged about the inner periphery of each said annular transfer body.

16. A device as claimed in claim 15, wherein each said first guide means comprises a substantially rectangular frame greater in width than the inside diameter of the said grab ring and the outside diameter of the said tire building drum; each said frame comprising two parallel longitudinal members extending transversely in relation to the said first and the said second axis and along which a respective one of said annular transfer bodies is mounted in sliding manner.

17. A device as claimed in claim 16, wherein each said member is connected integral with the said grab ring by means of pins adjustable in length and parallel with the said first and the said second axis.

18. A device as claimed in claim 14, wherein said expansible means comprise two curved jaws and a number of rollers extending parallel with the said second axis from each side of each said jaw; the said jaws being mutually mobile in a plane perpendicular to the said second axis, for assuming the said first configuration, wherein the said jaws are closed, and the said second configuration wherein the said jaws are open; and the said rollers on the same side of the said two jaws defining, when the said jaws are in the said second configuration, a circular hanger having an outside diameter substantially equal to the inside diameter of a respective one of said beads, and being coaxial with the said second axis.

19. A device as claimed in claim 18, wherein adjusting means are provided for varying the position of each said roller on the respective said jaw, as a function of the inside diameter of the bead being handled.

20. A device as claimed in claim 19, wherein said adjusting means comprise a number of rings of substantially concentric holes formed on the said jaws and each is selectively engageable by the said rollers.

* * * * *